(12) United States Patent
Boger

(10) Patent No.: US 9,923,418 B2
(45) Date of Patent: Mar. 20, 2018

(54) WIRELESS POWER TRANSFER FOR PROCESS CONTROL

(71) Applicant: Henry William Boger, Hoover, AL (US)

(72) Inventor: Henry William Boger, Hoover, AL (US)

( * ) Notice: Subject to any disclaimer, the term of this patent is extended or adjusted under 35 U.S.C. 154(b) by 0 days.

(21) Appl. No.: 15/296,241

(22) Filed: Oct. 18, 2016

(65) Prior Publication Data

US 2018/0026479 A1      Jan. 25, 2018

Related U.S. Application Data

(63) Continuation-in-part of application No. 14/726,551, filed on May 31, 2015, now abandoned.

(51) Int. Cl.
| | |
|---|---|
| *H01F 38/00* | (2006.01) |
| *H02J 50/12* | (2016.01) |
| *H02J 50/80* | (2016.01) |

(52) U.S. Cl.
CPC .............. *H02J 50/12* (2016.02); *H02J 50/80* (2016.02)

(58) Field of Classification Search
CPC . H02J 5/005; H02J 7/025; H02J 50/12; H01F 38/14
USPC ........................................................ 307/104
See application file for complete search history.

(56) References Cited

U.S. PATENT DOCUMENTS

| | | |
|---|---|---|
| 3,319,926 A | 5/1967 | Boger |
| 3,371,946 A | 3/1968 | Bleyle, Jr. et al. |
| 3,780,767 A | 12/1973 | Borg et al. |
| 5,190,264 A | 3/1993 | Boger |
| 5,680,889 A | 10/1997 | Boger |
| 5,728,942 A | 3/1998 | Boger |
| 5,771,929 A | 6/1998 | Boger |
| 5,890,505 A | 4/1999 | Boger |
| 5,988,586 A | 11/1999 | Boger |
| 6,272,401 B1 | 8/2001 | Boger et al. |
| 6,453,261 B2 | 9/2002 | Boger et al. |
| 6,745,084 B2 | 6/2004 | Boger et al. |

(Continued)

OTHER PUBLICATIONS

Agbinya, Johnson I., Wireless Power Transfer, 2nd Ed., 2016, pp. 73-149, River Publishers.

(Continued)

*Primary Examiner* — Alfonso Perez Borroto
(74) *Attorney, Agent, or Firm* — Bush Intellectual Property Law; Kenneth M. Bush

(57) ABSTRACT

A process control apparatus for the control of an industrial process is disclosed herein. The process control apparatus may include a power supply that supplies electrical power, and a single source disposed about an industrial process, the source in electrical communication with the power supply to receive electrical power therefrom. The source converts the electrical power into a wireless power signal. A number of receivers may be disposed about the industrial process, each receiver adapted to receive the power signal wirelessly, convert the power signal into electrical power, and communicate the electrical power onto a field device. The power signal may include an oscillating magnetic field M or electromagnetic waves that may be generally in the ultra-high frequency (UHF) range. Related methods of process control of an industrial process are also disclosed herein.

19 Claims, 6 Drawing Sheets

(56) References Cited

U.S. PATENT DOCUMENTS

| | | |
|---|---|---|
| 6,807,986 B2 | 10/2004 | Boger |
| 6,880,579 B2 | 4/2005 | Boger |
| 6,917,858 B2 | 7/2005 | Boger |
| 7,539,560 B2 | 5/2009 | Boger et al. |
| 7,818,093 B2 | 10/2010 | Boger |
| 7,890,216 B2 | 2/2011 | Boger et al. |
| 8,185,248 B2 | 5/2012 | Ensworth et al. |
| 8,400,024 B2 | 3/2013 | Joannopoulos et al. |
| 8,538,560 B2 | 9/2013 | Brown et al. |
| 8,655,494 B2 | 2/2014 | Boger |
| 8,823,214 B2 | 9/2014 | Liu et al. |
| 8,823,319 B2 | 9/2014 | Von Novak, III et al. |
| 9,064,404 B2 | 6/2015 | Zhu et al. |
| 9,068,669 B2 | 6/2015 | Boger et al. |
| 9,194,501 B2 | 11/2015 | Cunningham et al. |
| 2006/0043208 A1* | 3/2006 | Graham ................. A01G 25/16 239/71 |
| 2007/0021140 A1 | 1/2007 | Keyes, IV et al. |
| 2008/0058995 A1* | 3/2008 | Holindrake ............ A01G 25/16 700/284 |
| 2010/0181961 A1 | 7/2010 | Novak et al. |
| 2012/0305096 A1* | 12/2012 | Haller ..................... F16K 31/02 137/15.08 |
| 2013/0119780 A1 | 5/2013 | Kim et al. |
| 2014/0361741 A1 | 12/2014 | Von Novak, III et al. |
| 2015/0137746 A1 | 5/2015 | Lee et al. |

OTHER PUBLICATIONS

Kesler, Morris, Highly Resonant Wireless Power Transfer: Safe, Efficient, and over Distance, 2013, pp. 1-32, WiTricity Corporation.
International Search Report and Written Opinion of the International Searching Authority issued in PCT/US2017/56598 dated Dec. 28, 2017, 8 pages.

\* cited by examiner

WIRELESS POWER TRANSFER FOR PROCESS CONTROL

CROSS-REFERENCE TO RELATED APPLICATIONS

The present application is a continuation-in-part of U.S. patent application Ser. No. 14/726,551 filed May 31, 2015, which is hereby incorporated by reference in its entirety herein.

FIELD OF THE INVENTION

The present disclosure relates to industrial process control or monitoring systems. More specifically, a system that adds wireless power and wireless communication capability to field devices in such systems is disclosed herein.

BACKGROUND OF THE INVENTION

Control systems are used to monitor and control inventories of industrial processes. Typically, the control system performs these functions using field devices distributed at key locations in the industrial process and coupled to the control circuitry in the control center by a process control loop. The term field device refers to any device that performs a function in a distributed control or process monitoring system, including all devices used in the measurement, control, and monitoring of industrial processes. Industrial process, as used herein, refers, for example, to an oil refinery, a steel or other metal works, a chemical production facility, or an electrical power generation station.

Some field devices may include a transducer. As used herein, a transducer is understood to mean either a device that generates an output signal based on a physical input or that generates a physical output based on an input signal. Typically, a transducer transforms an input into an output having a different form. Transducer may include, for example, a pressure sensor, thermistor, thermocouple, strain gauge, flow meter, pH meter, positioner, actuator, solenoid, stepper motor, relay, and indicator light.

Typically, each field device also includes communication circuitry that is used for communicating with a process control center, or other circuitry, over a process control loop. In some installations, the process control loop is also used to deliver a regulated current and/or voltage to the field device for powering the field device. The process control loop also carries data either in analog or digital format.

Traditionally, analog field devices have been connected to the control center by two-wire process control current loops, with each device connected to the control center by a single two-wire control loop. Typically, a voltage differential is maintained between the two wires of the process control loop generally within a range of voltages from 12-45 volts for analog mode and 9-50 volts for digital mode. Some analog field devices transmit a signal to the control center by modulating the current running through the current loop to a current proportional to the sensed process variable. Other analog field devices can perform an action under the control of the control center by controlling the magnitude of the current through the loop. In addition to, or in the alternative, the process control loop can carry digital signals used for communication with field devices. Digital communication allows a much larger degree of communication than analog communication. Field devices that communicate digitally can respond to and communicate selectively with the control center and/or other field devices. Further, such devices can provide additional signaling such as diagnostics and/or alarms.

In some installations, wireless technologies have begun to be used to communicate with field devices. Wireless operation simplifies field device wiring and setup. Wireless installations are currently used in which the field device is manufactured to include an internal battery, potentially charged by a solar cell, or other technique to obtain power without any sort of wired connection. Problems exist in using an internal battery as the energy demands of wireless devices may vary greatly depending on numerous factors such as the device reporting rate, device elements, et cetera, so that the battery may become exhausted unpredictably. When the battery is exhausted, replacement of the battery usually requires a technician specially trained for that task. The battery may be physically difficult to access for replacement, for example, due to elevation, due to being located within a nest of pipes or equipment, due to being placed in a hazardous location.

It is known to transmit power to a field device using non-radiative fields. For example, magnetic induction may be used to transfer energy from a primary coil to a secondary coil without a direct electrical connection. See U.S. Patent App. Pub. No. 2012/0305096 to Haller. Inductive chargers, such as those found commonly in electric toothbrushes, operate on this same principle. However, for these systems to operate efficiently, the primary coil (source) and secondary coil (device) must be located in close proximity and carefully positioned with respect to one another. Thus, the magnetic coupling between the source and device coils must be large for proper operation. Furthermore, one primary coil transfers energy to one secondary coil.

Accordingly, there is a need for improved apparatus as well as related methods for control of industrial processes.

BRIEF SUMMARY OF THE INVENTION

These and other needs and disadvantages may be overcome by the apparatus and related method of operation disclosed herein. Additional improvements and advantages may be recognized by those of ordinary skill in the art upon study of the present disclosure.

A process control apparatus for the control of an industrial process is disclosed herein. In various aspects, the process control apparatus may include a power supply that supplies electrical power, and a single source disposed about an industrial process, the source in electrical communication with the power supply to receive electrical power from the power supply. The source converts the electrical power into a power signal, in various aspects. A number of receivers may be disposed about the industrial process, each receiver of the number of receivers adapted to receive the power signal wirelessly, convert the power signal into electrical power, and communicate the electrical power onto a field device. The power signal may include an oscillating magnetic field M or electromagnetic waves that may be generally in the ultra high frequency (UHF) range.

Related methods of process control of an industrial process are disclosed herein. In various aspects, the methods may comprise the steps of receiving a power signal by a receiver, the power signal being selected from an oscillating magnetic field M and an electromagnetic field in the ultra high frequency (UHF) range, converting the power signal into electrical power by the receiver, and powering a field device disposed about said industrial process by flowing the electrical power onto the field device from the receiver.

This summary is presented to provide a basic understanding of some aspects of the apparatus and related methods of operation disclosed herein as a prelude to the detailed description that follows below. Accordingly, this summary is not intended to identify key elements of the apparatus and related methods of operation disclosed herein or to delineate the scope thereof.

Figure 1:
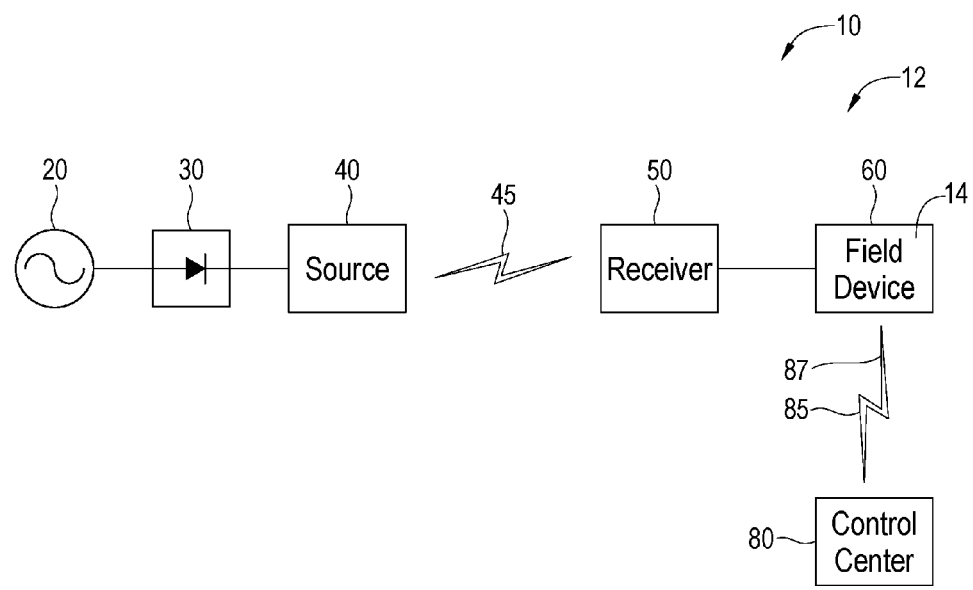
FIG. 1 illustrates by schematic diagram an exemplary implementation of a process control apparatus.

The Figures are exemplary only, and the implementations illustrated therein are selected to facilitate explanation. The number, position, relationship, electrical properties, and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

A process control apparatus for the control of an industrial process and related methods of operation are disclosed herein. In various aspects, the process control apparatus may include a receiver that converts a power signal wirelessly transmitted to the receiver into electrical power. The power signal may be, for example, an oscillating magnetic field or an electromagnetic field generally within the ultra high frequency (UHF) range. The receiver is in electrical communication with one or more field devices disposed about the industrial process to flow electrical power from the receiver to the one or more field devices, in various aspects. The process control apparatus may include a source that generates the power signal and that communicates the power signal to the receiver.

Field devices may require power generally in the range of 40-50 milliwatts (mW), in various aspects. Thus, the power requirement of a hundred such field devices would be less than about 5,000 mW. The source and receiver support efficient energy transfer over distances that are many times the size of the source and receiver. In various aspects, it is contemplated that the power signal may be transmitted over a distance of up to about 1,000 feet. In various aspects, it is contemplated that the power signal may be transmitted over a distance ranging from about 1 foot to about 1,000 feet.

A number of sources may be disposed about the industrial process to generate a network that encompasses at least portions of the industrial process. A number of receivers may be disposed about the industrial process with each of the receivers of the number of receivers in communication with the network to receive the power signal from the network.

Field device(s) may be in wireless communication with a control center to exchange data with the control center in order to direct the operation of the industrial process. The data may be, for example, indicative of a process variable, indicative of an operational status of the field device, or the data may direct operation(s) of the field device.

Related methods of process control of an industrial process are disclosed herein. In various aspects, the methods may comprise the steps of receiving a power signal by a receiver, the power signal being selected from an oscillating magnetic field M and an electromagnetic field in the ultra high frequency (UHF) range, converting the power signal into electrical power by the receiver, and powering a field device disposed about said industrial process by flowing the electrical power onto the field device from the receiver. The methods may comprise the step of directing operations of the field device by communicating data wirelessly between the field device and a control center, the control center thereby directing the operations of the field device. The methods may comprise the step of detecting the operational status of the field device by communicating data wirelessly between the field device and the control center. The methods may comprise the step of determining process variables at the field device by communicating data wirelessly between the field device and the control center.

FIG. 1 illustrates exemplary process control apparatus 10. As illustrated in FIG. 1, process control apparatus 10 includes power supply 20, rectifier 30, source 40, receiver 50, and field device 60. Process control apparatus 10, as illustrated, further includes control center 80.

Power supply 20, in this implementation, is a source of alternating current (AC) electrical power that may be, for example, mains electric. In alternative implementations, power supply 20 may be a source of direct current (DC) electrical power such as, for example, a battery or a photovoltaic cell that converts solar energy into DC electrical power.

Rectifier 30, which is in electrical communication with power supply 20, converts alternating current communicated from power supply 20 into direct current (DC) with voltage signal $V_g$ having a sinusoidal waveform, in this implementation. Rectifier 30 may include a filter that filters the current communicated to rectifier 30 from power supply 20, an amplifier, or a transformer to regulate the voltage $V_g$ output by rectifier 30. Rectifier 30 may be otherwise configured or omitted entirely, in various other implementations, for example, implementations that substitute a DC source for power supply 20, as would be readily recognized by those of ordinary skill in the art upon study of this disclosure.

Rectifier 30, which is in electrical communication with source 40, then flows power with voltage signal $V_g$ onto source 40, and source 40 transmits power to receiver 50 by power signal 45 that is wireless. Magnetic field M that propagates from source 40 to receiver 50 forms power signal 45, in this implementation (see FIG. 2). Receiver 50 may convert power signal 45 into electrical power that is then communicated from receiver 50 to field device 60 in order to power field device 60.

Field device 60 may be positioned at location 14 within an industrial process 12. Field device 60 may include one or more transducers, and field device 60 may be operable, for example, to detect process variables at the location 14, to control process variables at location 14, or to both detect process variables and control process variables at location 14. In various aspects, field device 60 may be a control valve. The International Society of Automation Standard ANSI/ISA-75.05.01, Control Valve Terminology, describes a control valve in these words: "A power actuated device the modifiers the fluid flow rate in a process control system. It consists of valve connected to an actuator mechanism (including all related accessories) that is capable of changing the position of a closure member in the response to a signal from the controlling system." A control valve may be positioned by a spring-opposed pneumatic actuator equipped with digital positioner, in various implementations.

Field device 60 may communicate with control center 80 by communication pathway 85 that is wireless. Communication pathway 85 may include electromagnetic waves, infrared (IR), other optical or other wireless communications. Communication pathway 85 communicates data 87 between field device 60 and control center 80. For example, communication pathway 85 may communicate data 87 from field device indicative of the operational status of field device 60, or communication pathway 85 may communicate data 87 from control center 80 to field device 60 that controls the operation of field device 60. The data 87 may be indicative of process variable at location 14 of the field device 60 in industrial process 12. Data 87 may be indicative of the operation of receiver 50 or may regulate the operation of receiver 50. Data 87 may include higher-level output, for example, that results from processing at the field device 60. Field device 60 may include a microcontroller, in various implementations, and the field device 60 may, for example, generate data 87 using process variable(s) and/or the operational status of field device 60. Field device 60 and control center 80 include component(s) that implement communication pathway 85 such as electronics, antenna, optics, software, etc., in this implementation. Data 87 may be in analog format, digital format, or combinations of analog format and digital format, in various implementations.

Control center 80 may include, for example, a computer, various I/O devices, whether analog, digital, physical or virtual, and mechanisms for implementing communication pathway 85, and control center 80 may be organized for interaction with a user, as would be readily recognized by those of ordinary skill in the art upon study of this disclosure. Control center 80 may be situated about the industrial process 12, in some implementations, or control center 80 may be, at least in part, situated remote from the industrial process 12, in other implementations. The user may interact with control center 80 to monitor the operation of industrial process 12 including data 87 from field device 60. The user may interact with control center 80 to control the operation of industrial process 12 including the transmission of data 87 to field device 60 from control center 80 to control the operation of field device 60 or the operation of receiver 50. In some implementations, control center 80 may be configured to control the operation of industrial process 12 automatically with little or no user input.

Figure 2:
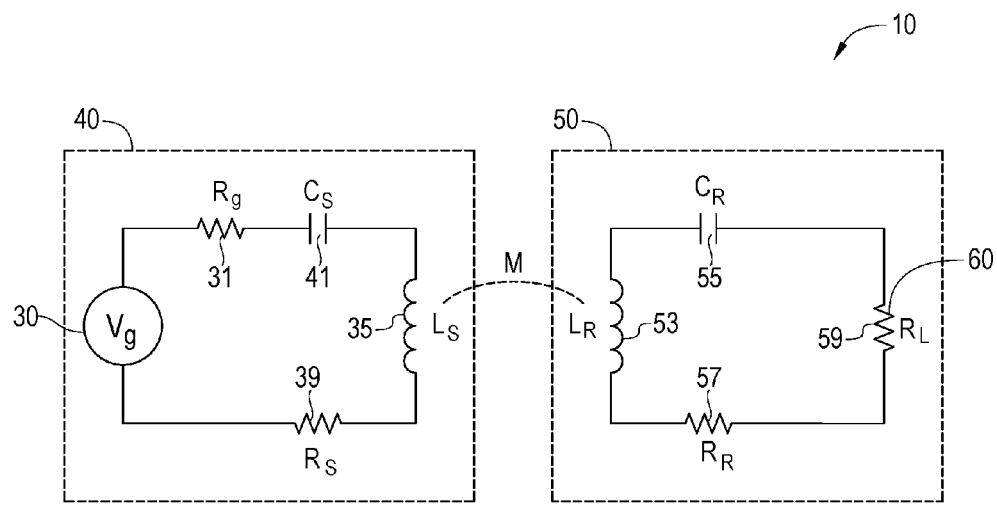
FIG. 2 illustrates by schematic diagram portions of the exemplary process control apparatus of FIG. 1.

FIG. 2 illustrates source 40 and receiver 50. As illustrated in FIG. 2, rectifier 30 inputs voltage signal $V_g$, which is sinusoidal, into source 40. Source 40 further includes capacitor 41 and inductor 35 in series to resonate in response to voltage signal $V_g$ in order to produce oscillating magnetic field M. Resistor 31 represents the generator resistance and resistor 39 represents the parasitic resistance of inductor 35 and capacitor 41, in this implementation.

Receiver 50 includes inductor 53 and capacitor 55 in series to resonate in response to oscillating magnetic field M, as inductors 35, 53 are coupled by mutual inductance M. In exemplary receiver 50, resistor 57 represents the parasitic resistance of inductor 53 and capacitor 55, and resistor 59, which has resistance $R_L$ as indicated in the illustration, represents the resistance (load) of field device 60.

Matching the resonant frequency $\omega_0$ between source 40 and receiver 50, respectively, results in:

$$\omega_0 = \frac{1}{\sqrt{C_S L_S}} = \frac{1}{\sqrt{C_R L_R}} \quad (1)$$

It may be shown that efficient power transfer can occur between source 40 and receiver 50 when the resonant frequency of source 40 is matched with the resonant frequency of receiver 50 per equation (1). Note that resistor 31 has resistance $R_g$, inductor 35 has inductance $L_S$, resistor 39 has resistance $R_S$, capacitor 41 has capacitance $C_S$, inductor 53 has inductance $L_R$, capacitor 55 has capacitance $C_R$, resistor 57 has resistance $R_R$, and resistor 59 has resistance $R_L$, as indicated in FIG. 2.

Further details of exemplary process control apparatus 10 including magnetic coupling of source 40 and receiver 50 by magnetic field M may be found, for example, in U.S. Pat. No. 8,400,024 entitled "Wireless Energy Transfer Across Variable Distances" to Joannopoulos et al. and in Morris Kesler, *Highly Resonant Wireless Power Transfer: Safe, Efficient, and over Distance*, Witricity Corp. (2013).

Using self-resonant coils in a strongly coupled regime such as that described in process control apparatus 10, efficient non-radiative power transfer over distances up to 8 times the radius of the coils was experimentally demonstrated. In one experiment, 60 watts was transferred with ~40% efficiency over distances in excess of 2 meters. See André Kurs, Aristeidis Karalis, Robert Moffatt, J. D. Joannopoulos, Peter Fisher, Marin Soljačić, *Wireless Power Transfer via Strongly Coupled Magnetic Resonances*, Science, Vol. 317, Issue 5834, pp. 83-86, 6 Jul. 2007.

Figure 3:
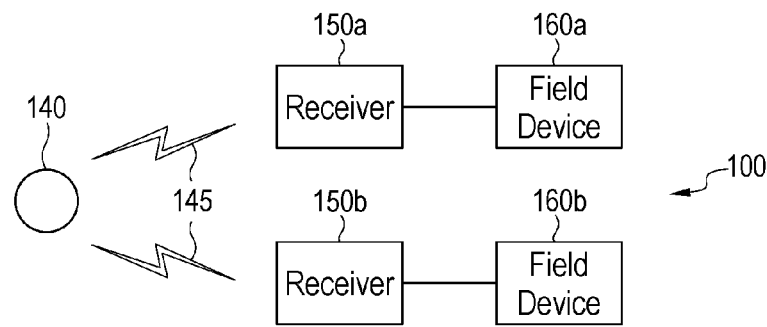
FIG. 3 illustrates by schematic diagram a second exemplary implementation of a process control apparatus.

FIG. 3 illustrates process control apparatus 100. As illustrated in FIG. 3, process control apparatus 100 includes source 140, receivers 150a, 150b, and field devices 160a, 160b. In this exemplary implementation, source 140 transmits power to receivers 150a, 150b by wireless power signal 145 that is configured as an oscillating magnetic field M, as per source 40 of process control apparatus 10. Receivers 150a, 150b convert power signal 145 into electrical power that is then flowed onto field devices 160a, 160b, respectively, to power field devices 160a, 160b. Note that, in this implementation, source 140 may supply power simultaneously to two receivers, receivers 150a, 150b. Any number of receivers, such as receivers 150a, 150b, may be supplied generally simultaneously by a single source, such as source 140, in various other implementations.

Figure 4:
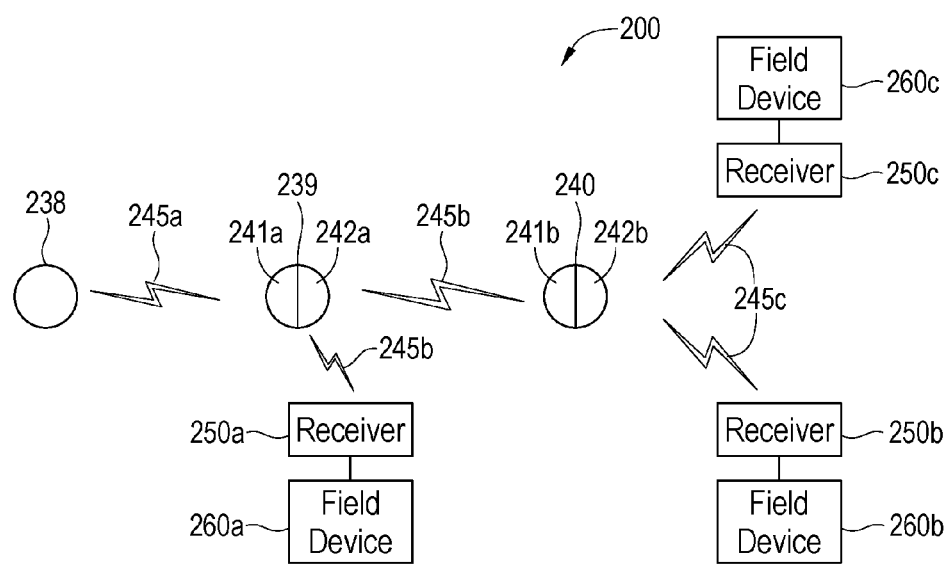
FIG. 4 illustrates by schematic diagram a third exemplary implementation of a process control apparatus.

FIG. 4 illustrates process control apparatus 200. As illustrated in FIG. 4, source 238 transmits power to repeater 239 by power signal 245a, and repeater 239 transmits power to repeater 240 by power signal 245b that is derived from power transmitted to repeater 239 by power signal 245a. Source 238 is generally configured similar to source 40 of process control apparatus 10, in this implementation. Repeaters 239, 240 include receivers 241a, 241b and sources 242a, 242b, respectively, as illustrated. Receivers 241a, 241b may be similar to receiver 50 of process control apparatus 10, in this implementation, and sources 242a, 242b may be similar to source 40 of process control apparatus 10. Receivers 241a, 241b convert power signals 245a, 245b, respectively, into electrical power, as illustrated. Receivers 241a, 241b are in electrical communication with sources 242a, 242b to flow the electrical power onto sources 242a, 242b, respectively, and sources 242a, 242b generate power signals 245b, 245c using power flowed onto sources 242a, 242b from receivers 241a, 241b, as illustrated.

In this implementation, repeaters 239, 240 propagate power signal 245a from source 238 to receivers 250a, 250b, 250c that may be situated too remotely from source 238 to receive power signal 245a directly from source 238. For example, source 242a of repeater 239 transmits power to receiver 250a by power signal 245b, and source 242b of repeater 240 transmits power to receivers 250b, 250c by power signal 245c. As illustrated in FIG. 4, receivers 250a, 250b, 250c are operative to convert power signals 245b, 245c into electrical power that powers field devices 260a, 260b, 260c.

Figure 5:
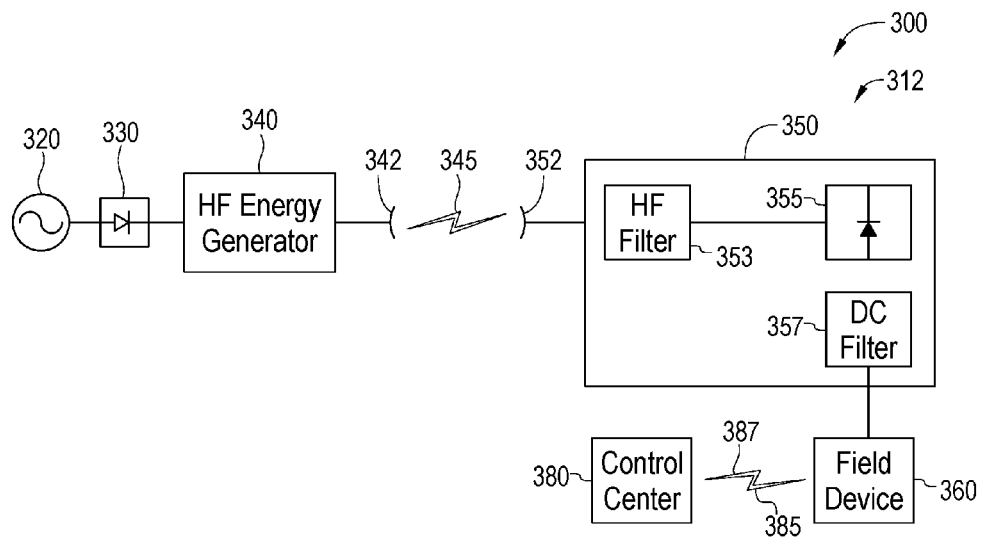
FIG. 5 illustrates by schematic diagram a fourth exemplary implementation of a process control apparatus.

As illustrated in FIG. 5, process control apparatus 300 includes power supply 320, rectifier 330, source 340, receiver 350, field device 360, and control center 380. Power supply 320 is a source of alternating current (AC) power that may be, for example, mains electric, in this implementation, and rectifier 330 converts the AC power from source 320 into DC power that is then supplied to source 340. Source 340 generates power signal 345 in the form of electromagnetic waves, for example, in the ultra high frequency (UHF) range generally between about 300 MHz and about 3 GHz, in various implementations. Source 340 may be configured to use semiconductors in generating power signal 345. Power signal 345 in the form of electromagnetic waves generated by source 340 is transmitted wirelessly from antenna 342 of source 340 to antenna 352 of receiver 350 to transfer power wirelessly from source 340 to receiver 350.

As illustrated in FIG. 5, receiver 350 is formed as a rectifying antenna (rectenna) that includes antenna 352, high frequency (HF) filter 353, rectifier 355 and DC filter 357. HF filter 353 acts as an impedance match between antenna 352 and rectifier 355. Rectifier 355 transforms power signal 345, which comprises electromagnetic waves, into DC power that is then passed through DC filter 357 and then delivered to field device 360. DC filter 357 removes harmonics that may be generated by non-linear behavior of rectifier 355. Of course, a transformer, filter, and so forth may be included between DC filter 357 and field device 360 in various implementations to make the power output from DC filter 357 suitable for input into field device 360, as would be readily recognized by those of ordinary skill in the art upon study of this disclosure.

Field device 360 may include one or more transducers, and field device 360 may be operable, for example, to detect process variables in industrial process 312, to control process variables in industrial process 312, or to both detect process variables and control process variables in industrial process 312. Field device 360 and control center 380 may communicate with one another wirelessly by communication pathway 385, as illustrated.

Communication pathway 385 communicates data 387 between field device 360 and control center 380, in this implementation. Data 387, for example, may be indicative of the operational status of field device 360, may control the operation of field device 360, or may be indicative of process variable(s) detected by field device 360. Data 387 may be indicative of the operational status of receiver 350 or data 387 may control the operation of receiver 350.

Figure 6:
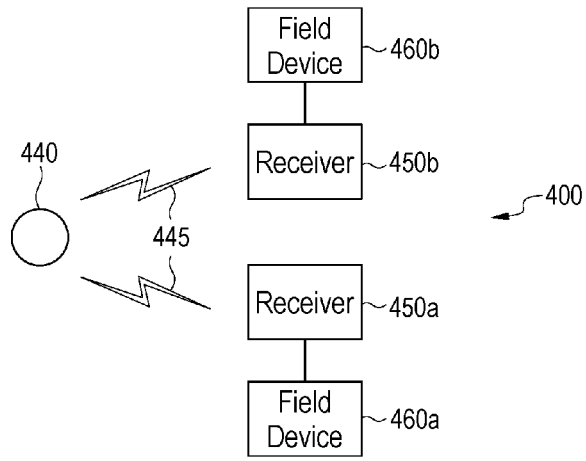
FIG. 6 illustrates by schematic diagram a fifth exemplary implementation of a process control apparatus.

FIG. 6 illustrates process control apparatus 400. As illustrated in FIG. 6, process control apparatus 400 includes source 440, receivers 450a, 450b, and field devices 460a, 460b. In this exemplary implementation, source 440 transmits power to receivers 450a, 450b by wireless power signal 445 in the form of electromagnetic waves, for example, as per source 340 of exemplary process control apparatus 300. Receivers 450a, 450b, in this implementation, are formed as rectifying antennas, for example, as per receiver 350 of exemplary process control apparatus 300. Field devices 460a, 460b are in electrical communication with receivers 450a, 450b, as illustrated. Receivers 450a, 450b convert power signal 445 into electrical power that is then flowed onto field devices 460a, 460b, respectively, to power field devices 460a, 460b, in this implementation. Note that, in this implementation, source 440 may supply power simultaneously to two receivers, receivers 450a, 450b to power two field devices 460a, 460b simultaneously. Any number of receivers, such as receivers 450a, 450b, may be supplied simultaneously by a single source, such as source 440, in various other implementations.

Figure 7:
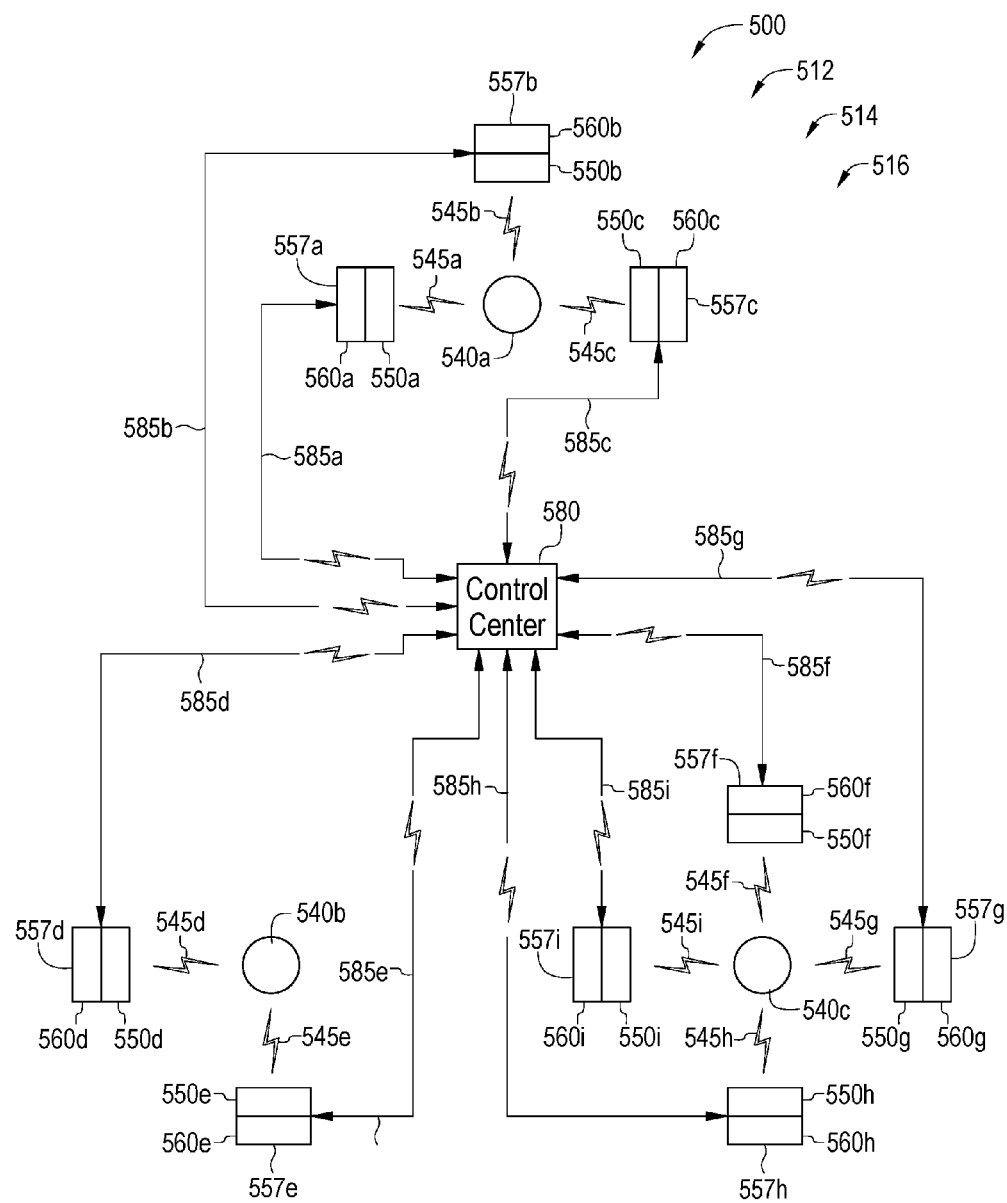
FIG. 7 illustrates by schematic diagram power communication and data communication in a sixth exemplary implementation of a process control apparatus.

FIG. 7 illustrates exemplary process control apparatus 500 that includes field devices 560a, 560b, 560c, 560d, 560e, 560f, 560g, 560h, 560i disposed about industrial process 512. Sources 540a, 540b, 540c are located about industrial process 512 to communicate power wirelessly to receivers 550a, 550b, 550c, 550d, 550e, 550f, 550g, 550h, 550i using power signals 545a, 545b, 545c, 545d, 545e, 545f, 545g, 545h, 545i, as illustrated. Receivers 550a, 550b, 550c, 550d, 550e, 550f, 550g, 550h, 550i convert power signals 545a, 545b, 545c, 545d, 545e, 545f, 545g, 545h, 545i into electrical power and then flow the electrical power onto field devices 560a, 560b, 560c, 560d, 560e, 560f, 560g, 560h, 560i, respectively, as illustrated. Source 540a flows power onto receivers 550a, 550b, 550c by power signals 545a, 545b, 545c, respectively, source 540b flows power onto receivers 550d, 550e by power signals 545d, 545e, respectively, and source 540c flows power onto receivers 550f, 550g, 550h, 550i by power signals 545f, 545g, 545h, 545i, respectively, as illustrated.

Sources 540a, 540b, 540c may be configured similar to source 40 of process control apparatus 10 and receivers 550a, 550b, 550c, 550d, 550e, 550f, 550g, 550h, 550i may be configured similar to receiver 50 of process control apparatus 10, in some implementations. In other implementations, sources 540a, 540b, 540c, may be configured similar to source 340 of process control apparatus 300 and receivers 550a, 550b, 550c, 550d, 550e, 550f, 550g, 550h, 550i may be configured similar to receiver 350 of process control apparatus 300. In yet other implementations, sources 540a, 540b, 540c may assume various combinations of configurations similar to source 40 of process control apparatus 10 and source 340 of process control apparatus 300, and receivers 550a, 550b, 550c, 550d, 550e, 550f, 550g, 550h, 550i may assume various combinations of configurations similar to receiver 50 of process control apparatus 10 and receiver 350 of process control apparatus 300, or other wireless power transmission technologies.

Sources 540a, 540b, 540c form network 514 comprising power signals 545a, 545b, 545c, 545d, 545e, 545f, 545g, 545h, 545i that may encompass at least portions of industrial process 512. Network 514 has a star configuration, in this exemplary implementation, and network 514 may be self-organizing with sources, such as sources 540a, 540b, 540c, transferring power to various receivers, such as receivers 550a, 550b, 550c, 550d, 550e, 550f, 550g, 550h, 550i, for example, based upon proximity of the receiver to the source. Each source may transfer power to various numbers of receivers simultaneously. For example source 540a transfers power to receivers 550a, 550b, 550c, source 540b transfers power to receivers 550d, 550e, and source 540c transfers power to receivers 550f, 550g, 550h, 550i, in the implementation of FIG. 7. Likewise, one receiver may flow power onto one or more field devices. Any number of sources, such as sources 540a, 540b, 540c, and receivers, such as receivers 550a, 550b, 550c, 550d, 550e, 550f, 550g, 550h, 550i, may be disposed about industrial process 512. Also note that, for example, power signals 545a, 545b, 545c from source 540a may be formed as multiple power signals that may be of varying types, as indicated, or power signals 545a, 545b, 545c may be aggregated into a single power signal, in various implementations.

Field device 560a, 560b, 560c, 560d, 560e, 560f, 560g, 560h, 560i and corresponding receiver 550a, 550b, 550c, 550d, 550e, 550f, 550g, 550h, 550i form assembly 557a, 557b, 557c, 557d, 557e, 557f, 557g, 557h, 557i, respectively, as illustrated in FIG. 7. Assembly 557a, 557b, 557c, 557d, 557e, 557f, 557g, 557h, 557i communicates data with control center 580 by communication pathway 585a, 585b, 585c, 585d, 585e, 585f, 585g, 585h, 585i, respectively, which may be in part wireless, as illustrated in FIG. 7. Communication pathways 585a, 585b, 585c, 585d, 585e, 585f, 585g, 585h, 585i form communication network 516, as illustrated, for communication of data with control center 580.

Figure 8A:
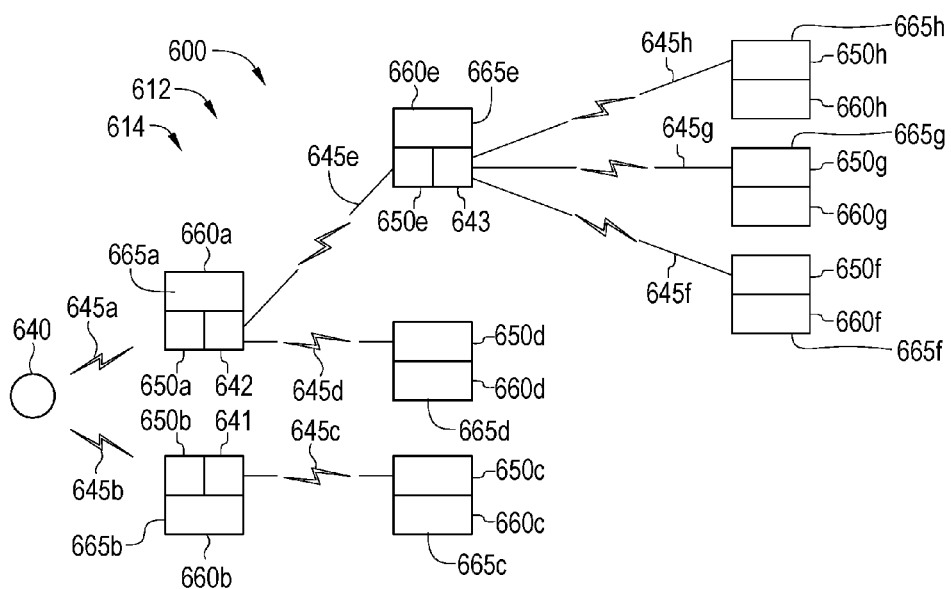
FIG. 8A illustrates by schematic diagram power communication in a seventh exemplary implementation of a process control apparatus.
Figure 8B:
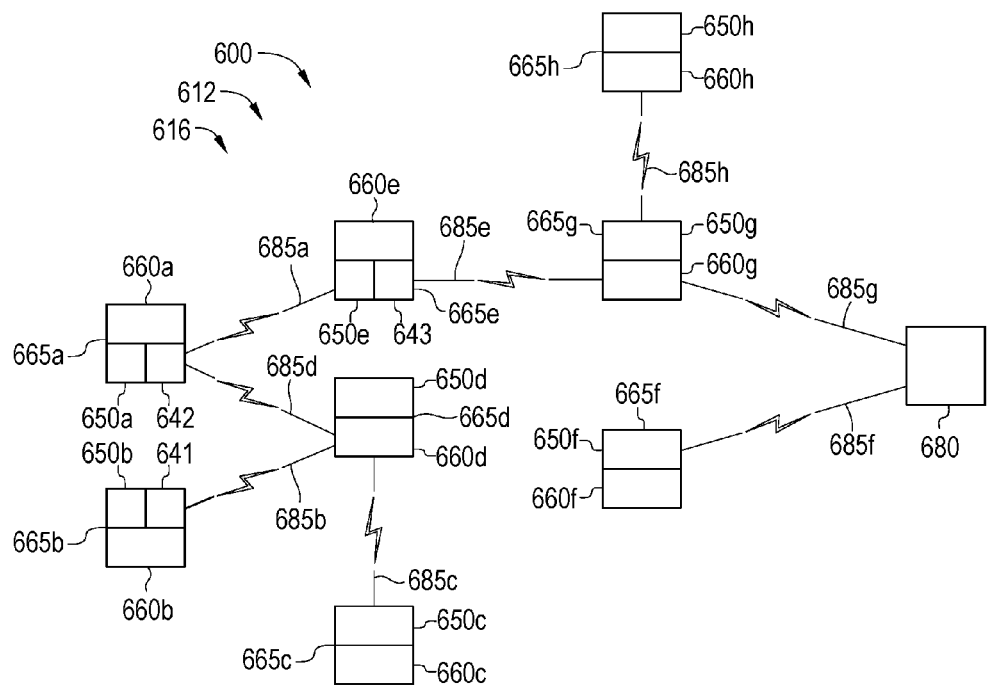
FIG. 8B illustrates by schematic diagram data communication in the seventh exemplary implementation process control apparatus of FIG. 8A; and, FIG. 9 illustrates by process flow chart an exemplary method of operation of a process control apparatus according to the present inventions.

FIGS. 8A and 8B illustrate exemplary process control apparatus 600 that includes field devices 660a, 660b, 660c, 660d, 660e, 660f, 660g, 660h disposed about industrial process 612. As illustrated in FIG. 8A, receivers 650a, 650b, 650c, 650d, 650e, 650f, 650g, 650h are in electrical communication with field devices 660a, 660b, 660c, 660d, 660e, 660f, 660g, 660h, respectively, and receivers 650a, 650b, 650c, 650d, 650e, 650f, 650g, 650h convert power signals 645a, 645b, 645c, 645d, 645e, 645f, 645g, 645h into electrical power that is flowed onto field devices 660a, 660b, 660c, 660d, 660e, 660f, 660g, 660h to power field devices 660a, 660b, 660c, 660d, 660e, 660f, 660g, 660h, as illustrated. Receivers 650a, 650b, 650c, 650d, 650e, 650f, 650g, 650h in combination with corresponding field device 660a, 660b, 660c, 660d, 660e, 660f, 660g, 660h, respectively, form assemblies 665a, 665b, 665c, 665d, 665e, 665f, 665g, 665h, as illustrated. Assembly 665a includes source 642, assembly 665b includes source 641, and assembly 665e includes source 643, in this implementation.

As illustrated in FIG. 8A, exemplary control apparatus 600 includes sources 640, 641, 642, 643. As illustrated, source 640 transfers electrical power wirelessly to receivers 650a, 650b by power signals 645a, 645b, respectively. Source 641 transfers electrical power wirelessly onto receiver 650c by power signal 645c, as illustrated. Source 642 transfers electrical power wirelessly onto receiver 650d, 650e by power signals 645d, 645e, respectively, as illustrated. Source 643 flows electrical power wirelessly onto receiver 650f, 650g, 650h by power signal 645f, 645g, 645h, respectively, as illustrated. Thus, in this implementation, power flows wirelessly from source 640 to field devices 660a, 660b, 660c, 660d, 660e, 660f, 660g, 660g over network 614 that is configured as a mesh network, as illustrated in FIG. 8A. Network 614 comprises power signals 645a, 645b, 645c, 645d, 645e, 650f, 650g, 650h, as illustrated.

Sources 640, 641, 642, 643 may be configured as source 40 of process control apparatus 10, as source 340 of process control apparatus 300, or various combinations thereof, and receivers 650a, 650b, 650c, 650d, 650e, 650f, 650g, 650h may be configured as receiver 50 of process control apparatus 10, receiver 350 of process control apparatus 300, or combinations thereof to be operable with sources 640, 641, 642, 643. Power signals 645a, 645b, 645c, 645d, 645e, 645f, 645g, 645h may be formed, for example, as power signal 45 of process control apparatus 10, power signal 345 of process control apparatus 300, or combinations thereof. Network 614 may include any number of sources, such as sources 640, 641, 642, 643, in communication with any number of receivers, such as receivers 650a, 650b, 650c, 650d, 650e, 650f, 650g, 650h, and the receiver(s) may be in electrical communication with any number of field devices, such as field devices 660a, 660b, 660c, 660d, 660e, 660f, 660g, 660h, in various implementations.

Receivers 650a, 650b, 650c, 650d, 650e, 650f, 650g, 650h are in electrical communication with field devices 660a, 660b, 660c, 660d, 660e, 660f, 660g, 660h, respectively to flow power onto field devices 660a, 660b, 660c, 660d, 660e, 660f, 660g, 660h. Note that receiver 650b communicates with source 641 to flow electrical power onto source 641 that powers source 641 in order to generate power signals 645c, receiver 650a communicates with source 642 to flow electrical power onto source 642 that powers source 642 in order to generate power signals 645d, 645e, and receiver 650e communicates with source 643 to flow electrical power onto source 643 that powers source 643 in order to generate power signals 645f, 645g, 645h, as illustrated.

FIG. 8B illustrates data flow in exemplary control apparatus 600. As illustrated in FIG. 8B, assemblies 665a, 665b, 665c, 665d, 665e, 665f, 665g, 665h are in communication with control center 680 to exchange data with control center 680. In this example, assembly 665b and assembly 665c communicate with assembly 665d by communication pathways 685b, 685c, respectively. Assembly 665d communicates with assembly 665a by communication pathway 685d, as illustrated. Assembly 665a communicates with assembly 665e by communication pathway 685a, and assemblies 665e, 665h communicate with assembly 665g by communication pathways 685e, 685h, respectively. Assemblies 665f, 665g communicate with control center 680 by communication pathways 685f, 685g, respectively, as illustrated. Data, for example, may be communicated between assembly 665b and control center 680 by the sequence of communication pathways 685b, 685d, 685a, 685e, 685g, in this implementation. The data, according to this example, may be indicative of the operation of assembly 665b including receiver 650b, field device 660b, or source 641 or the data may control the operation of assembly 665b including receiver 650b, field device 660b, or source 641. Communication pathways 685a, 685b, 685c, 685d, 685e, 685f, 685g, 685h of communication network 616 may be wireless, at least in part, as indicated. Communication pathways 685a, 685b, 685c, 685d, 685e, 685f, 685g, 685h form communication network 616 that has a mesh configuration and may be self-organizing, as illustrated in FIG. 8B.

In operation, in a process control apparatus, such as process control apparatus 10, 100, 200, 300, 400, 500, 600, power from a power supply, such as power supply 20, 320, is communicated to a source, such as source 40, 140, 238, 340, 440, 540a, 540b, 540c, 640, by electrical communication between the power supply and the source. The source then communicates power wirelessly to a receiver, such as receiver 50, 150a, 150b, 350, 450a, 450b, 550a, 550b, 550c, 550d, 550e, 550f, 550g, 550h, 550i, 650a, 650b, by a power signal, such as power signal 45, 145, 345, 445, 545a, 545b, 545c, 545d, 545e, 545f, 545g, 545h, 545i, 645a, 645b. The receiver converts the power signal into electrical power and flows the electrical power onto a field device, such as field device 60, 160a, 160b, 360, 460a, 460b, 560a, 560b, 560c, 560d, 560e, 560f, 560g, 560h, 560i, 660a, 660b, to power the field device.

A receiver, such as receiver 241a, 241b, 650a, 650b, 650e may flow power onto a source, such as source 242a, 242b, 641, 642, 643, to power the source in order to generate a power signal, such as power signal 245b, 245c, 645c, 645d, 645e, 645f, 645g, 645h, and a receiver, such as receiver 250a, 250b, 650c, 650d, 650e, 650f, 650g, 650h, may convert the power signal into electrical power to power a field device, such as field device 260a, 260b, 660c, 660d, 660e, 660f, 660g, 660h. One source may transfer the power signal to several receivers, and each of the several receivers may then flow power onto a corresponding field device.

The field device may communicate with a control center, such as control center 80, 380, 580, 680 by a communication pathway, such as communication pathway 85, 385, 585a, 585b, 585c, 585d, 585e, 585f, 585g, 585h, 585i, 685a, 685b, 685c, 685d, 685e, 685f, 685g, 685h, which may be in part wireless. The communication pathways in combination with assemblies, such as assembly 557a, 557b, 557c, 557d, 557e, 557f, 557g, 557h, 557i, 665a, 665b, 665c, 665d, 665e, 665f, 665g, 665h, may form a communication network, such as communication network 616, and data may be communication over the communication network.

Data, such as data 87, 387, may be communicated from field device to the control center indicative of the operational status of the field device, or data may be communicated from the control center to the field device that controls the operation of the field device. Data may be communicated between the receiver and the control center indicative of the operation of the receiver or that controls the operation of the receiver. Data may be communicated between the assembly and the control center indicative of the operation of the assembly or that controls the operation of the assembly. While the data from the field devices may be simply indications of process variable, the data may also contain additional information. For example, the data may include diagnostic and/or maintenance information for example, with respect to the field device or the receiver in electrical communication with the field device. Further, the data from the field devices may include an alarm indicative of a fault associated with the field device or the associated receiver. Further still, in implementations where the multiple field devices include PV generators, and one or more actuators that can effect a change in the process variable, the units themselves may actually provide local closed-loop process control autonomously without control center interaction, but still subject to wireless communication.

A number of sources may be disposed about an industrial process, such as industrial process 12, 312, 512, 612 to communicate power wirelessly by power signals that cover at least portions of the industrial process, and the sources and power signals may form a network, such as network 514, 614. Receivers disposed within the industrial process may receive power from the network, and the network may self-organize.

Figure 9:
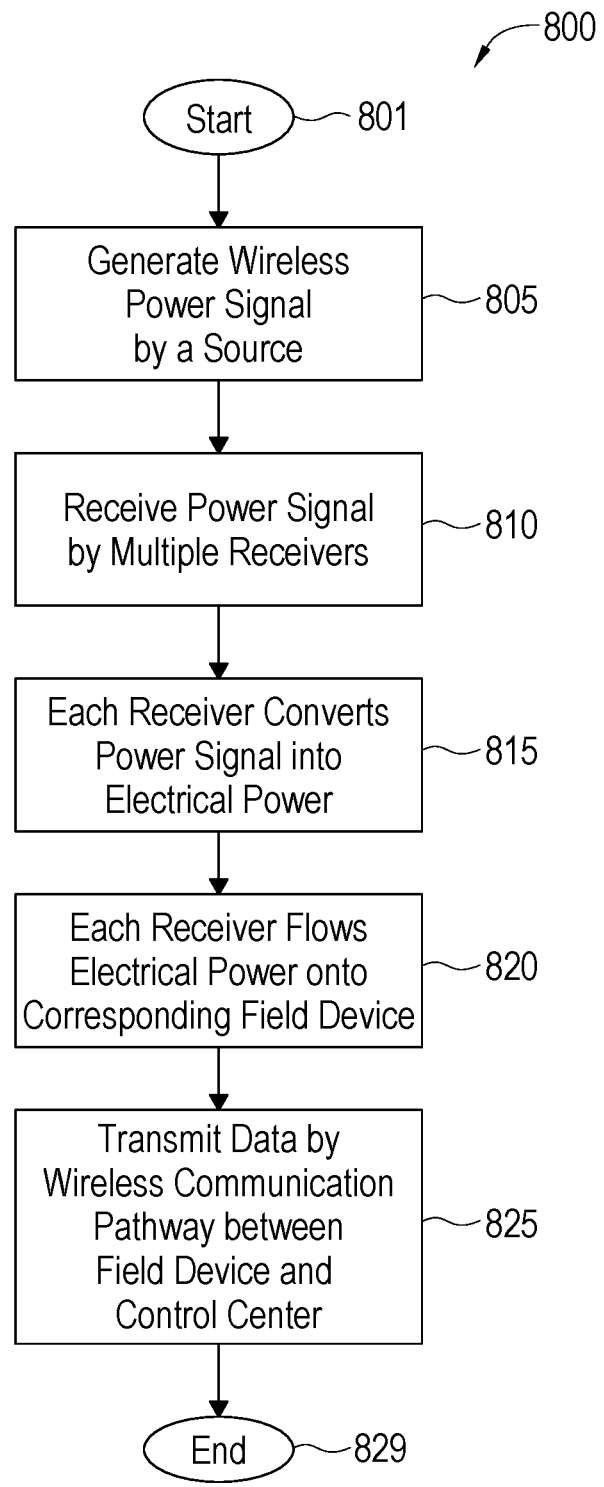

An exemplary method of operation 800 is illustrated in FIG. 9. As illustrated, method of operation 800 is entered at step 801, and at step 805 the wireless power signal is generated by the source. At step 810, multiple receivers receive wirelessly the power signal generated at step 805. The wireless power signal is then converted into electrical power by the receivers, at step 815 of exemplary method of operation 800. The electrical power is then flowed from the receivers onto corresponding field devices in electrical communication with the receivers to power the field devices, at step 820. Step 825 includes wireless transmission of data between field device in combination with receiver and the control center. Exemplary method of operation 800 terminates at step 829, as illustrated.

The methods may comprise the step of directing operations of the field device by communicating data wirelessly between the field device and the control center. The methods may comprise the step of detecting the operational status of the field device by communicating data wirelessly between the field device and the control center. The methods may comprise the step of directing operations of the receiver by communicating data wirelessly between the receiver and the control center. The methods may comprise the step of detecting the operational status of the receiver by communicating data wirelessly between the field device and the control center. The methods may comprise the step of directing operations of the assembly by communicating data wirelessly between the assembly and the control center. The methods may comprise the step of detecting the operational status of the assembly by communicating data wirelessly between the assembly and the control center. The methods may comprise the step of determining process variables in the industrial process by detecting the process variables using the field device and communicating data wirelessly between the field device and the control center, the data being at least in part indicative of the process variables.

The control center may display the operational status of the field device, the receiver, the source, or the assembly to the user. The control center may allow the user to control operations of the field device, the receiver, the source, or the assembly.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the claims.

The invention claimed is:

1. A process control apparatus, comprising:
a power supply that supplies electrical power;
a source disposed about an industrial process, the source in electrical communication with the power supply to receive electrical power from the power supply, the source converts the electrical power into a power signal;

a first receiver and a second receiver disposed about the industrial process remote from the source, the first receiver and the second receiver receive the power signal wirelessly simultaneously from the source, convert the power signal into electrical power, and communicate the electrical power by wired communication to corresponding field devices;

wherein the first receiver, the second receiver, and the field devices are powered only by electrical power supplied by the power signal.

2. The apparatus of claim 1, the power signal comprises electromagnetic waves.

3. The apparatus of claim 2, the electromagnetic waves are in the ultra high frequency (UHF) range.

4. The apparatus of claim 1, the power signal comprises an oscillating magnetic field M.

5. The apparatus of claim 1, the source comprises a source resonator that resonates to generate an oscillating magnetic field M;
- at least one of the first receiver and the second receiver comprises a receiver resonator that resonates in response to the oscillating magnetic field M to transfer power from the source resonator to the receiver resonator; and
- a resonant frequency $\omega_0$ of the source resonator and receiver resonator are approximately the same.

6. The apparatus of claim 1, further comprising:
- a control center in wireless communication with the field devices to exchange data wirelessly with the field devices.

7. The apparatus of claim 6, the data indicative of a process variable, the data indicative of an operational status of the field devices, or the data directs operations of the field devices.

8. An apparatus to power wirelessly a first field device and a second field device of an industrial process, comprising:
- a source disposed about said industrial process, the source operable to convert electrical power into a power signal;
- a first receiver means for receiving the power signal and converting the power signal into electrical power and a second receiver means for receiving the power signal and converting the power signal into electrical power, the first receiver means and the second receiver means deployed about said industrial process remote from the source, the first receiver means in wired electrical communication with said first field device to flow electrical power onto said first field device, and the second receiver means in wired electrical communication with said second field device to flow electrical power onto said second field device simultaneously with the flowing of electrical power onto the first field device by the first receiver means;

wherein the first receiver means, the second receiver means, said first field device, and said second field device are powered only by electrical power supplied by the power signal.

9. The apparatus of claim 8, further comprising:
- the source comprising an inductor and a capacitor arranged in series to resonate at a natural frequency $\omega_0$;
- a receiver comprising an inductor and a capacitor arranged in series to resonate at the natural frequency $\omega_0$;
- a mutual inductance M coupling the source to the receiver.

10. The apparatus of claim 9, a number of receivers simultaneously coupled to the source.

11. A method of process control of an industrial process, the method comprising the steps of:
- transmitting wirelessly a power signal from a single source to a first receiver and to a second receiver simultaneously, the power signal being selected from an oscillating magnetic field M and an electromagnetic field in the ultra high frequency (UHF) range;
- converting the power signal into electrical power by the first receiver and by the second receiver; and
- powering field devices disposed about said industrial process by flowing the electrical power onto the field devices from the first receiver and from the second receiver;

wherein the first receiver, the second receiver, and the field devices are powered only by electrical power supplied by the power signal.

12. The method of claim 11, further comprising the step of:
- forming a network by disposing two or more sources about said industrial process, each source of the two or more sources generating a power signal.

13. The method of claim 11, further comprising the step of:
- directing operations of the field devices by communicating data wirelessly between the field devices and a control center.

14. The method of claim 11, further comprising the step of:
- detecting the operational status of the field devices by communicating data wirelessly between the field devices and the control center.

15. The method of claim 11, further comprising the step of:
- determining process variables at the field devices by communicating data wirelessly between the field devices and the control center.

16. A process control apparatus, comprising:
- a power supply that supplies electrical power;
- a source disposed about an industrial process, the source in electrical communication with the power supply to receive electrical power from the power supply, the source operable to convert the electrical power into a power signal and transmit the power signal wirelessly over a distance of 1-1000 feet;
- at least two field devices disposed about the industrial process, wherein each of the at least two field devices requires power in the range of 40-50 mW to operate, wherein each of the at least two field devices has an attached receiver, wherein each receiver is operable to receive the power signal wirelessly from the source, convert the power signal into electrical power, and communicate the electrical power to the attached field device;

wherein each of the at least two field devices and the attached receiver are powered only by electrical power supplied by the power signal.

17. The apparatus of claim 16, the source comprises a source resonator that resonates to generate an oscillating magnetic field M;
- wherein each receiver includes a receiver resonator that resonates in response to the oscillating magnetic field M to transfer power from the source resonator to the receiver resonator; and
- a resonant frequency $\omega_0$ of the source resonator and each receiver resonator are approximately the same.

18. The apparatus of claim 16, further comprising a control center in wireless communication with the at least two field devices to exchange data wirelessly with the at least two field devices.

19. The apparatus of claim 18, the data indicative of a process variable, the data indicative of an operational status of the at least two field devices, or the data directs operations of the at least two field devices.

* * * * *